US008698468B2

(12) United States Patent
Yamane

(10) Patent No.: US 8,698,468 B2
(45) Date of Patent: Apr. 15, 2014

(54) CONTROL DEVICE, CONTROL METHOD, AND POWER SUPPLY DEVICE

(75) Inventor: Mitsuru Yamane, Saitama (JP)

(73) Assignee: Sony Corporation (JP)

( * ) Notice: Subject to any disclaimer, the term of this patent is extended or adjusted under 35 U.S.C. 154(b) by 156 days.

(21) Appl. No.: 13/352,520

(22) Filed: Jan. 18, 2012

(65) Prior Publication Data
US 2012/0195073 A1 Aug. 2, 2012

(30) Foreign Application Priority Data

Jan. 28, 2011 (JP) ................................ P2011-016667

(51) Int. Cl.
*G05F 1/40* (2006.01)

(52) U.S. Cl.
USPC .......................................................... 323/282

(58) Field of Classification Search
USPC ........................... 323/222, 282–284, 288, 351
See application file for complete search history.

(56) References Cited

U.S. PATENT DOCUMENTS

| | | | | |
|---|---|---|---|---|
| 5,134,355 A | * | 7/1992 | Hastings | 323/211 |
| 5,367,247 A | * | 11/1994 | Blocher et al. | 323/222 |
| 5,804,951 A | * | 9/1998 | Rivet | 323/223 |
| 6,222,743 B1 | * | 4/2001 | Meyer | 363/41 |
| 7,719,248 B1 | * | 5/2010 | Melanson | 323/283 |
| 7,821,237 B2 | * | 10/2010 | Melanson | 323/222 |
| 7,852,017 B1 | * | 12/2010 | Melanson | 315/291 |
| 7,852,051 B2 | * | 12/2010 | Erdl | 323/222 |
| 8,022,683 B2 | * | 9/2011 | Thompson et al. | 323/285 |
| 8,212,491 B2 | * | 7/2012 | Kost et al. | 315/247 |
| 8,248,145 B2 | * | 8/2012 | Melanson | 327/432 |
| 8,441,237 B2 | * | 5/2013 | Schmid et al. | 323/223 |
| 8,476,879 B2 | * | 7/2013 | Gaboury et al. | 323/272 |
| 8,482,944 B1 | * | 7/2013 | Fukuda | 363/53 |
| 8,502,463 B2 | * | 8/2013 | Mizukawa et al. | 315/209 R |
| 2010/0284207 A1 | | 11/2010 | Watanabe et al. | |

FOREIGN PATENT DOCUMENTS

JP 2010-261862 A 11/2010

\* cited by examiner

*Primary Examiner* — Adolf Berhane
(74) *Attorney, Agent, or Firm* — Lerner, David, Littenberg, Krumholz & Mentlik, LLP

(57) ABSTRACT

There is provided a control device including a control unit, the control unit being configured to, when a first time, during which a level of a voltage output from a rectifier circuit for rectifying an alternating current supplied from an alternating-current power supply is lower than a level of a threshold voltage, has reached a threshold time, output a stop signal for stopping an operation of a power factor correction circuit to a control circuit that controls the operation of the power factor correction circuit.

6 Claims, 8 Drawing Sheets

CONTROL DEVICE, CONTROL METHOD, AND POWER SUPPLY DEVICE

CROSS-REFERENCE TO RELATED APPLICATION

The present application claims priority from Japanese Patent Application No. JP 2011-016667 filed in the Japanese Patent Office on Jan. 28, 2011, the entire content of which is incorporated herein by reference.

BACKGROUND

The present disclosure relates to a control device, a control method, and a power supply device.

A power supply device having a PFC (Power Factor Correction) circuit has been proposed (see JP 2010-261862A, for example).

A boost-type PFC circuit, which is among PFC circuits, includes an inductor, a diode, and a switching element, and can set an output voltage higher than an input voltage.

SUMMARY

In such a power supply device having a PFC circuit, it is preferable that the PFC circuit be operated constantly to stably supply an output voltage.

However, when the PFC circuit is operated constantly, there is a possibility that degradation of or damage to the switching element in the PFC circuit may occur upon occurrence of instantaneous interruption of an alternating-current power supply, for example.

In light of the foregoing, it is desirable to provide a control device, a control method, and a power supply device that are novel and improved, that can stably supply an output voltage, and that can avoid a possibility of degradation of or damage to elements.

According to an embodiment of the present disclosure, there is provided a control device including a control unit, the control unit being configured to, when a first time, during which a level of a voltage output from a rectifier circuit for rectifying an alternating current supplied from an alternating-current power supply is lower than a level of a threshold voltage, has reached a threshold time, output a stop signal for stopping an operation of a power factor correction circuit to a control circuit that controls the operation of the power factor correction circuit.

The control unit may include a comparison unit that compares the level of the voltage output from the rectifier circuit with the level of the threshold voltage, a time-measuring unit that measures, on the basis of a result of comparison performed by the comparison unit, the first time during which the level of the voltage output from the rectifier circuit is lower than the level of the threshold voltage, and an output unit that outputs, on the basis of a result of time-measuring performed by the time-measuring unit, the stop signal to the control circuit when the first time has reached the threshold time.

The level of the threshold voltage may be equal to a level of a minimum input voltage at which the power factor correction circuit is operable.

Threshold time may be equal to a time of a half cycle of an alternating current with the lowest frequency.

The control device may further include the power factor correction circuit and the control circuit.

According to another embodiment of the present disclosure, there is provided a control method including comparing a level of a voltage output from a rectifier circuit for rectifying an alternating current supplied from an alternating-current power supply with a level of a threshold voltage, measuring a first time during which the level of the voltage output from the rectifier circuit is lower than the level of the threshold voltage, and outputting a stop signal for stopping an operation of a power factor correction circuit to a control circuit that controls the operation of the power factor correction circuit when the first time has reached a threshold time.

According to still another embodiment of the present disclosure, there is provided a power supply device including a power factor correction circuit, a control circuit that controls an operation of the power factor correction circuit, and a control device that outputs to the control circuit a stop signal for stopping the operation of the power factor correction circuit when a first time, during which a level of a voltage output from a rectifier circuit for rectifying an alternating current supplied from an alternating-current power supply is lower than a level of a threshold voltage, has reached a threshold time.

According to the embodiments of the present disclosure described above, it is possible to stably supply an output voltage and avoid a possibility of degradation of and damage to elements.

DETAILED DESCRIPTION OF THE EMBODIMENTS

Figure 1:
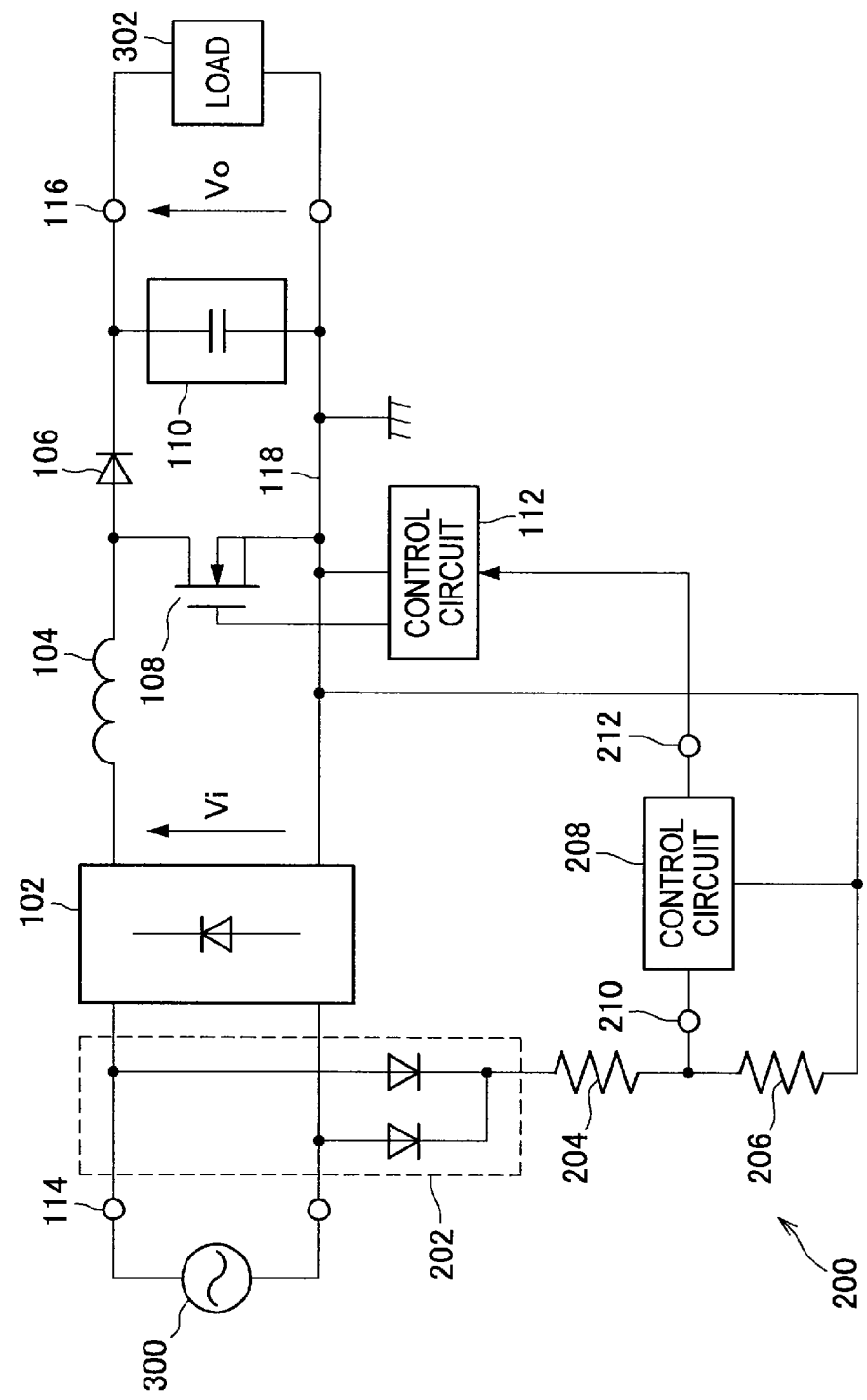
FIG. 1 is an explanatory diagram illustrating the configuration of a power supply device in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted by the same reference numerals, and repeated explanation of these structural elements is omitted.

Note that the description will be given in the following order.

1. Power Supply Device Having Conventional PFC Circuit
2. Power Supply Device in accordance with Embodiment of the Present Disclosure

[1. Power Supply Device Having Conventional PFC Circuit]

Figure 6:
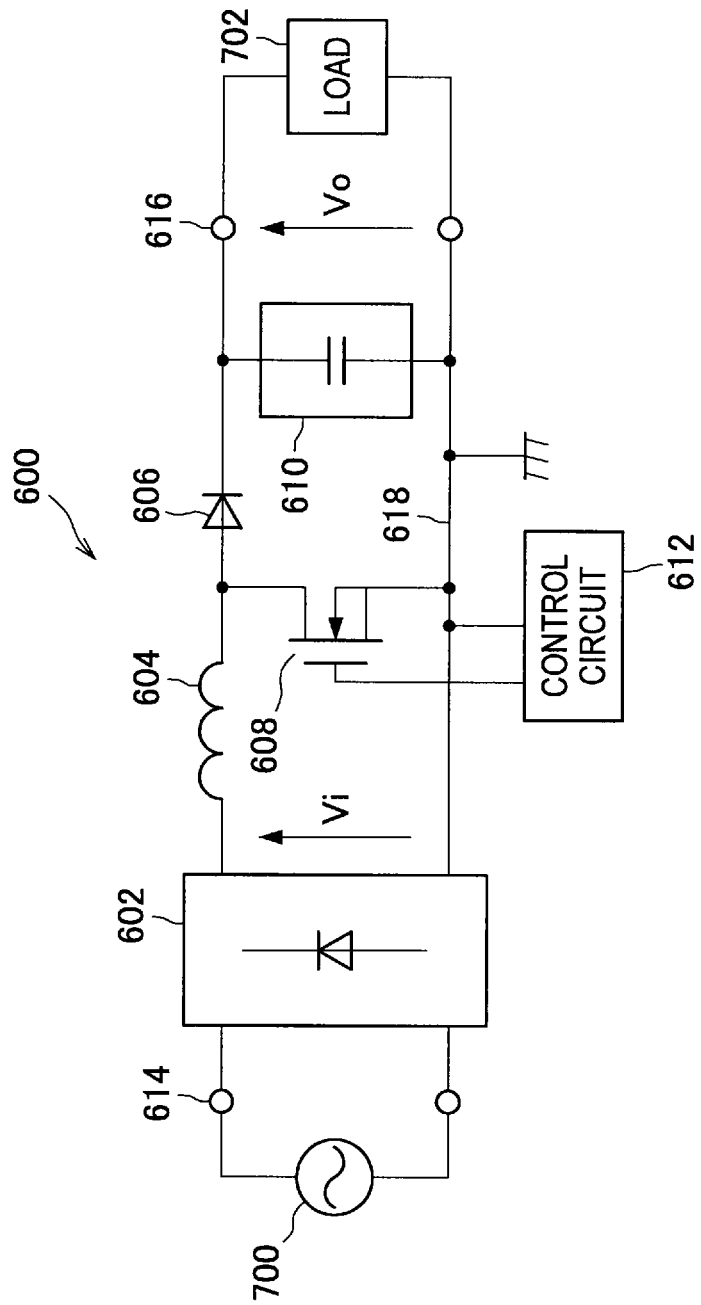
FIG. 6 is an explanatory diagram illustrating the configuration of a power supply device having a conventional PFC circuit.

First, a power supply device having a conventional PFC (Power Factor Correction) circuit will be described. FIG. 6 is an explanatory diagram illustrating the configuration of a power supply device having a conventional PFC circuit.

In FIG. 6, a power supply device 600 includes a rectifier circuit 602, an inductor 604, a diode 606, a switching element 608, a block capacitor 610, and a control circuit 612. The power supply device 600 includes a boost-type PFC circuit having the inductor 604, the diode 606, and the switching element 608, and can have an output voltage Vo higher than an input voltage Vi in accordance with control by the control circuit 612.

The rectifier circuit 602 rectifies an alternating current supplied from an alternating-current power supply 700 via an input terminal 614. The alternating-current power supply 700 is, for example, a commercial power supply.

The inductor 604 is connected at one end to the output of the rectifier circuit 602 and is connected at the other end to an output terminal 616 via the diode 606. An output voltage from the output terminal 616 is supplied to a load 702. The load 702 is, for example, an electronic device. The electronic device corresponds to, for example, a game machine or a television receiver.

The switching element 608 is connected between the other end of the inductor 604 and a reference potential point 618. The switching element 608 is, for example, a field-effect transistor. The block capacitor 610 is connected between the output terminal 616 and the reference potential point 618.

The control circuit 612 controls the switching element 608. The control circuit 612 can cause the switching element 608 to be turned on and off at fast speed by, for example, generating high-frequency drive pulses and applying the generated drive pulses to the gate of the switching element 608.

Figure 7:
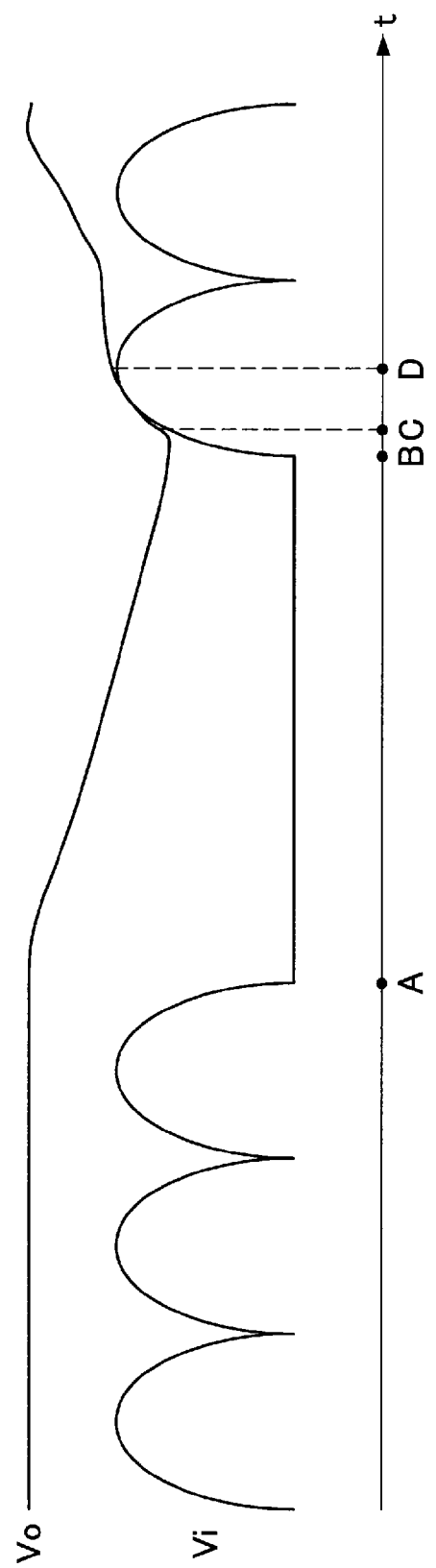
FIG. 7 is an explanatory diagram illustrating a case where instantaneous interruption of an alternating-current power supply occurs.

The power supply device 600 has, when an input voltage Vi is supplied normally as shown in FIG. 7, an output voltage Vo higher than the input voltage Vi (time t<A). When the power supply from the alternating-current power supply 700 is interrupted (time t=A), the output voltage Vo will gradually decrease (A<time t<B). Then, the power supply from the alternating-current power supply 700 is restored (time t=B). In the period when the input voltage Vi is higher than the output voltage Vo after the restoration (C<time t<D), a current flows to the output terminal 616 side via the inductor 604 and the diode 606 independently of the boosting operation of the PFC circuit. When the switching element 608 is turned on in this period, an extremely large current will flow through the switching element 608, which may possibly cause degradation of or damage to the switching element 608. Hereinafter, a phenomenon that power is interrupted during a period when the power supply from the alternating-current power supply 700 is short, for example, during a period after the power supply from the alternating-current power supply 700 is interrupted and before the output voltage Vo becomes zero will be referred to as "instantaneous interruption."

In order to avoid the possibility of degradation of or damage to the switching element 608 described above, the power supply device 600 can be additionally provided with, for example, a rectifier circuit (not shown) for rectifying an alternating current supplied from the alternating-current power supply 700 and a control circuit (not shown). Then, the control circuit compares the rectified waveform output from the rectifier circuit with a waveform obtained by peak-holding the rectified waveform, and, when the rectified waveform regularly exceeds a predetermined percentage, for example, 65% of the peak-hold value, determines that the power supply from the alternating-current power supply 700 is normal, and, when the rectified waveform does not regularly exceed the predetermined percentage of the peak-hold value, determines that the power supply from the alternating-current power supply 700 has been interrupted. When the control circuit determines that the power supply from the alternating-current power supply 700 has been interrupted, a PFC-circuit stop signal for stopping the operation of the PFC circuit is output to the control circuit 612 to stop the operation of the PFC circuit. Accordingly, it is possible to avoid the switching element 608 from being turned on in the period when the input voltage Vi is higher than the output voltage Vo in restoration of the power supply from the alternating-current power supply 700. Thus, it is possible to avoid the possibility that an extremely large current may flow through the switching element 608, and thus avoid the possibility of degradation of or damage to the switching element 608.

Figure 8:
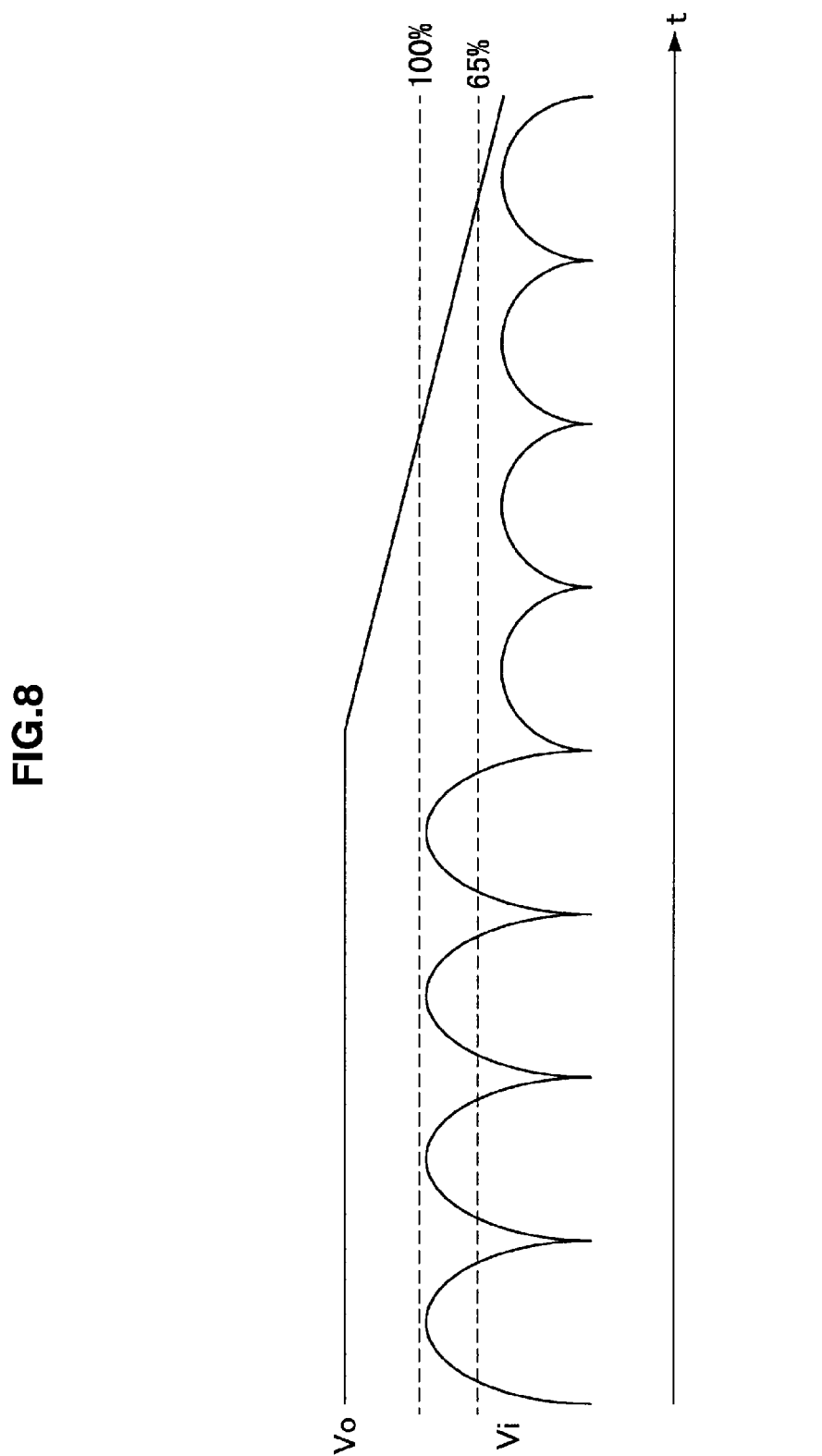
FIG. 8 is an explanatory diagram illustrating a case where an abrupt change occurs in an alternating-current power supply.

However, in the method of stopping the operation of the PFC circuit by determining that, when the aforementioned rectified waveform does not exceed a predetermined percentage of the peak-hold value, the power supply from the alternating-current power supply 700 has been interrupted, the operation of the PFC circuit is stopped even when the amplitude of the alternating current supplied form the alternating-current power supply 700 abruptly decreases and the peak value of the rectified waveform does not exceed a predetermined percentage, for example, 65% of the peak-hold value as shown in FIG. 8. Thus, there is a problem in that the output voltage Vo can drop inadequately. Hereinafter, a phenomenon that the amplitude of an alternating current supplied from the alternating-current power supply 700 abruptly decreases and the input voltage Vi abruptly drops will be referred to as "abrupt change."

[2. Power Supply Device in Accordance with Embodiment of the Present Disclosure]

Next, a power supply device in accordance with an embodiment of the present disclosure will be described. FIG. 1 is an explanatory diagram illustrating the configuration of a power supply device in accordance with an embodiment of the present disclosure.

In FIG. 1, the power supply device 100 includes a rectifier circuit 102, an inductor 104, a diode 106, a switching element 108, a block capacitor 110, and a control circuit 112. The power supply device 100 includes a boost-type PFC circuit having the inductor 104, the diode 106, and the switching element 108, and can have an output voltage Vo higher than an input voltage Vi in accordance with control by the control circuit 112. The boost-type PFC circuit is an example of a power factor correction circuit recited in the claims.

The rectifier circuit 102 rectifies an alternating current supplied from an alternating-current power supply 300 via an input terminal 114. The alternating-current power supply 300 is, for example, a commercial power supply.

The inductor 104 is connected at one end to the output of the rectifier circuit 102, and is connected at the other end to an output terminal 116 via the diode 106. An output voltage from the output terminal 116 is supplied to a load 302. The load 302 is, for example, an electronic device. The electronic device corresponds to, for example, a game machine or a television receiver.

The switching element 108 is connected between the other end of the inductor 104 and a reference potential point 118. The switching element 108 is, for example, a field-effect transistor. The block capacitor 110 is connected between the output terminal 116 and the reference potential point 118.

The control circuit 112 controls the switching element 108. The control circuit 112 can cause the switching element 108 to be turned on and off at fast speed by, for example, generating high-frequency drive pulses and applying the generated drive pulses to the gate of the switching element 108. The control circuit 112, upon receiving a high-level PFC-circuit stop signal, stops the application of drive pulses to the switching element 108, thereby stopping the operation of the PFC circuit. Meanwhile, the control circuit 112, upon receiving a low-level PFC-circuit stop signal, continues or starts the application of drive pulses to the switching element 108, thereby continuing or starting the operation of the PFC circuit.

In addition, the power supply device 100 includes a control device 200 that outputs a PFC-circuit stop signal for stopping the operation of the PFC circuit to the control circuit 112. The PFC-circuit stop signal is an example of a stop signal recited in the claims. The control device 200 is an example of a control unit recited in the claims.

The control device 200 includes a rectifier circuit 202, resistors 204 and 206, and a control circuit 208.

The rectifier circuit 202 is an example of a rectifier circuit recited in the claims, and rectifies an alternating current supplied from the alternating-current power supply 300 via the input terminal 114. Note that the control device 200 can have a configuration for supplying an output of the rectifier circuit 102 to the resistor 204 without having the rectifier circuit 202.

The resistor 204 is connected at one end to the output of the rectifier circuit 202, and is connected at the other end to an input terminal 210 of the control circuit 208. The resistor 206 is connected at one end to the input terminal 210 of the control circuit 208 and is connected at the other end to the reference potential point 118. The output of the rectifier circuit 202 is voltage-divided by the resistors 204 and 206, and is input to the control circuit 208 via the input terminal 210.

The control circuit 208 has a circuit shown in FIG. 2 described below, for example, and can output a PFC-circuit stop signal to the control circuit 112 via an output terminal 212.

Figure 2:
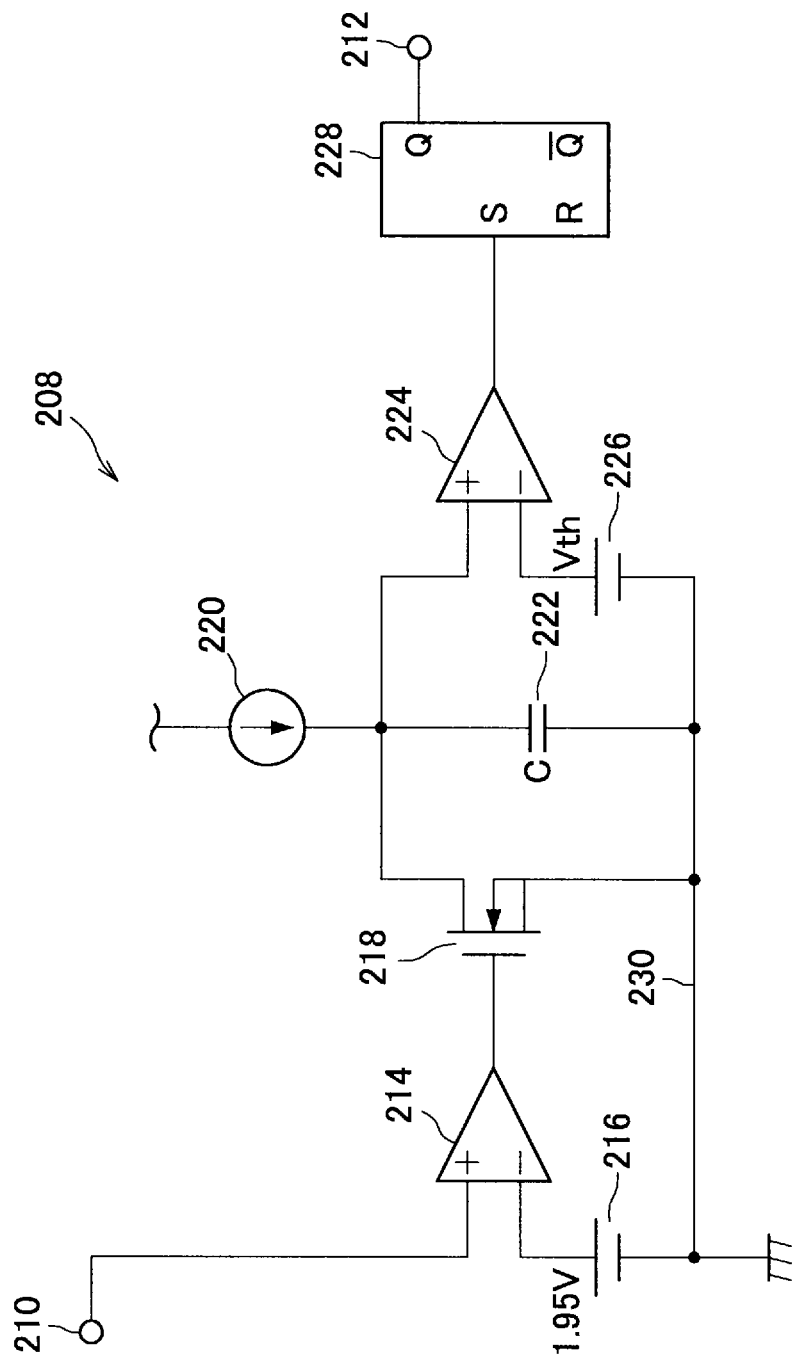
FIG. 2 is an explanatory diagram illustrating an example of a control circuit in FIG. 1.

FIG. 2 is an explanatory diagram illustrating an example of the control circuit 208 in FIG. 1.

In FIG. 2, the control circuit 208 includes comparators 214 and 224, constant voltage sources 216 and 226, a switching element 218, a constant current source 220, a capacitor 222, and an SR latch circuit 228.

The comparator 214 is an example of a comparator recited in the claims, and has a plus input terminal connected to the input terminal 210, and a minus input terminal connected to a reference potential point 230 via the constant voltage source 216. The comparator 214 compares the level of an input voltage Via supplied via the input terminal 210 with the level of a voltage supplied by the constant voltage source 216. When the level of the input voltage Via is higher than the level of the voltage supplied by the constant voltage source 216, the comparator 214 outputs a high-level signal to the gate of the switching element 218. Meanwhile, when the level of the input voltage Via is lower than the level of the voltage supplied by the constant voltage source 216, the comparator 214 outputs a low-level signal to the gate of the switching element 218.

The constant voltage source 216 supplies a voltage with an equal level to the minimum input voltage Vi at which the PFC circuit is operable (hereinafter referred to as "minimum operating voltage"). For example, the constant voltage source 216 supplies a voltage of 1.95 V. The minimum input voltage Vi at which the PFC circuit is operable is an example of a threshold voltage recited in the claims.

The switching element 218 is connected between one end of the constant current source 220 and the reference potential point 230. The switching element 218 is, for example, a field-effect transistor. The switching element 218 is turned on when a high-level signal is applied to the gate of the switching element 218. Meanwhile, the switching element 218 is turned off when a low-level signal is applied to the gate of the switching element 218.

The constant current source 220 supplies a current I for charging the capacitor 222. The magnitude of the current I supplied by the constant current source 220 is calculated from the following Formula 1. Note that Vth represents a threshold voltage supplied by the constant voltage source 226 and C represents the capacitance of the capacitor 222. In addition, the time of a half cycle of an alternating current with the lowest frequency will be hereinafter referred to as "threshold time." For example, provided that an alternating current with the lowest frequency is an alternating current with 45 Hz, the threshold time is 11 milliseconds. The time of a half cycle of an alternating current with the lowest frequency is an example of a threshold time recited in the claims.

[Formula 1]

$$I = \frac{Vth \cdot C}{\text{Time of Hal Cycle of Alternating Current with Lowest Frequency}} \quad \text{(Formula 1)}$$

The capacitor 222 is connected between one end of the constant current source 220 and the reference potential point 230. When the switching element 218 is turned off, the capacitor 222 is charged by the current I from the constant current source 220. Meanwhile, when the switching element 218 is turned on, the capacitor 222 is discharged. The switching element 218, the constant current source 220, and the capacitor 222 are examples of a time-measuring unit recited in the claims.

The comparator 224 is an example of an output unit recited in the claims, and has a plus input terminal connected to one end of the constant current source 220, and a minus input terminal connected to the reference potential point 230 via the constant voltage source 226. The comparator 224 compares the level of a voltage input to the plus input terminal with the level of a voltage supplied by the constant voltage source 226. When the level of the voltage input to the plus input terminal is higher than the level of the voltage supplied by the constant voltage source 226, the comparator 224 outputs a high-level signal to a set terminal of the SR latch circuit 228. Meanwhile, when the level of the voltage input to the plus input terminal is lower than the level of the voltage supplied by the constant voltage source 226, the comparator 224 outputs a low-level signal to the SR latch circuit 228.

The constant voltage source 226 supplies a threshold voltage Vth. The SR latch circuit 228 has a set terminal connected to the output of the comparator 224, and has a Q terminal connected to the output terminal 212. When a low-level signal is applied to the set terminal of the SR latch circuit 228, the SR latch circuit 228 outputs a low-level PFC-circuit stop signal from the Q terminal. Meanwhile, when a high-level signal is applied to the set terminal of the SR latch circuit 228, the SR latch circuit 228 outputs a high-level PFC-circuit stop signal from the Q terminal. The comparator 224 and the SR latch circuit 228 are examples of an output unit recited in the claims.

Figure 3:
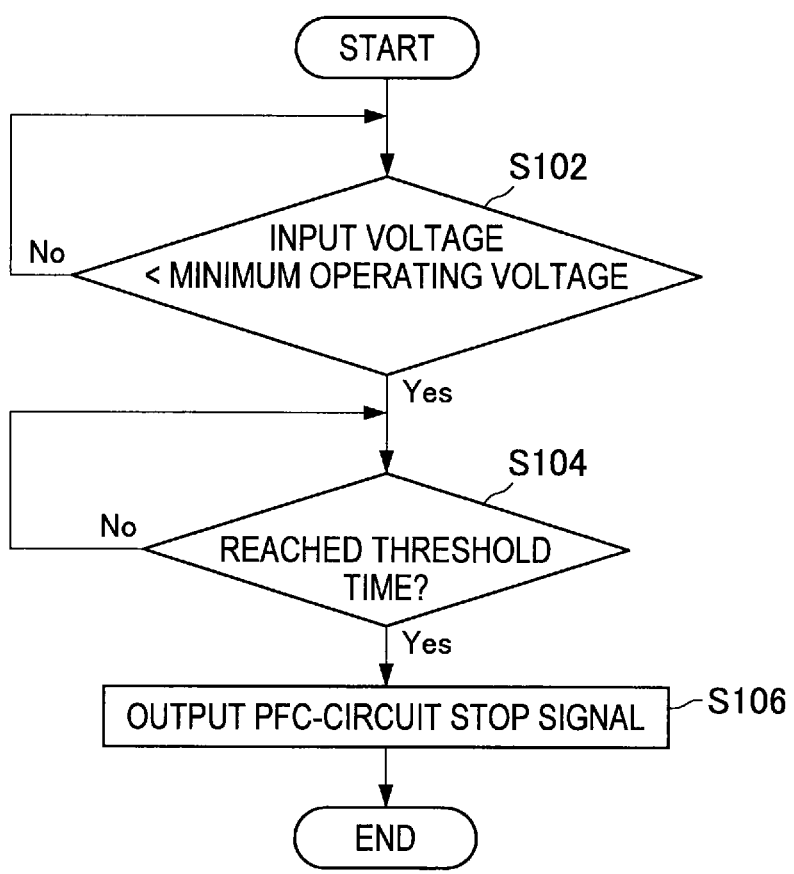
FIG. 3 is a flowchart illustrating the operation of the control circuit in FIG. 2.

Next, the operation of the control circuit 208 shown in FIG. 2 will be described. FIG. 3 is a flowchart illustrating the operation of the control circuit 208 in FIG. 2.

In FIG. 3, the control circuit 208 first determines if the level of the input voltage Via supplied via the input terminal 210 is lower than the level of the minimum operating voltage (step S102). For example, the control circuit 208 compares the level of the input voltage Via supplied via the input terminal 210 with the level of the minimum operating voltage supplied by the constant voltage source 216 in the comparator 214.

When the level of the input voltage Via is determined to be not lower than the level of the minimum operating voltage in step S102 (NO in step S102), the process of step S102 is performed again. For example, when the level of the input voltage Via is higher than the minimum operating voltage, the comparator 214 outputs a high-level signal to the gate of the switching element 218. When a high-level signal is applied to the gate of the switching element 218, the switching element 218 is turned on, whereby the capacitor 222 is discharged. At this time, the level of the voltage input to the plus input terminal of the comparator 224 becomes zero, and the comparator 224 outputs a low-level signal to the set terminal of the SR latch circuit 228. When a low-level signal is applied to the set terminal of the SR latch circuit 228, the SR latch circuit 228 outputs a low-level PFC-circuit stop signal from its Q terminal, and the low-level PFC-circuit stop signal is supplied to the control circuit 112 via the output terminal 212. When the control circuit 112 receives a low-level PFC-circuit stop signal, the control circuit 112 continues the operation of the PFC circuit.

Meanwhile, when the level of the input voltage Via is determined to be lower than the level of the minimum operating voltage in step S102 (YES in step S102), the flow proceeds to the process of the following step S104. For example, when the level of the input voltage Via is lower than the level of the minimum operating voltage, the comparator 214 outputs a low-level signal to the gate of the switching element 218. When a low-level signal is applied to the gate of the switching element 218, the switching element 218 is turned off, whereby the capacitor 222 is charged by the current I from the constant current source 220.

In the following step S104, the control circuit 208 measures the time during which the level of the input voltage Via is lower than the level of the minimum operating voltage (hereinafter referred to as "first time") and determines if the first time has reached the threshold time (step S104). The time during which the level of the input voltage Via is lower than the level of the minimum operating voltage is an example of a first time recited in the claims.

When the first time is not determined to have reached the threshold time in step S104 (NO in step S104), the process of step S104 is performed again. For example, the capacitor 222 is charged while the level of the input voltage Via is lower than the level of the minimum operating voltage. However, when the first time has not reached the threshold time, a potential at the constant current source 220 side of the capacitor 222, namely, the level of a voltage input to the plus input terminal of the comparator 224 is lower than the level of the threshold voltage Vth. At this time, the comparator 224 outputs a low-level signal to the set terminal of the SR latch circuit 228, and the SR latch circuit 228 outputs a low-level PFC-circuit stop signal from its Q terminal to the control circuit 112 via the output terminal 212.

Meanwhile, when the first time is determined to have reached the threshold time in step S104 (YES in step S104), the control circuit 208 outputs a PFC-circuit stop signal to the control circuit 112 via the output terminal 212 (step S106). For example, the capacitor 222 is charged while the level of the input voltage Via is lower than the level of the minimum operating voltage, and when the first time has reached the threshold time, a potential at the constant current source 220 side of the capacitor 222, namely, the level of a voltage input to the plus input terminal of the comparator 224 becomes higher than the threshold voltage Vth. At this time, the comparator 224 outputs a high-level signal to the set terminal of the SR latch circuit 228. When a high-level signal is applied to the set terminal of the SR latch circuit 228, the SR latch circuit 228 outputs a high-level PFC-circuit stop signal from its Q terminal, and the high-level PFC-circuit stop level is supplied to the control circuit 112 via the output terminal 212. When the control circuit 112 receives a high-level PFC-circuit stop signal, the control circuit 112 stops the operation of the PFC circuit.

Figure 4:
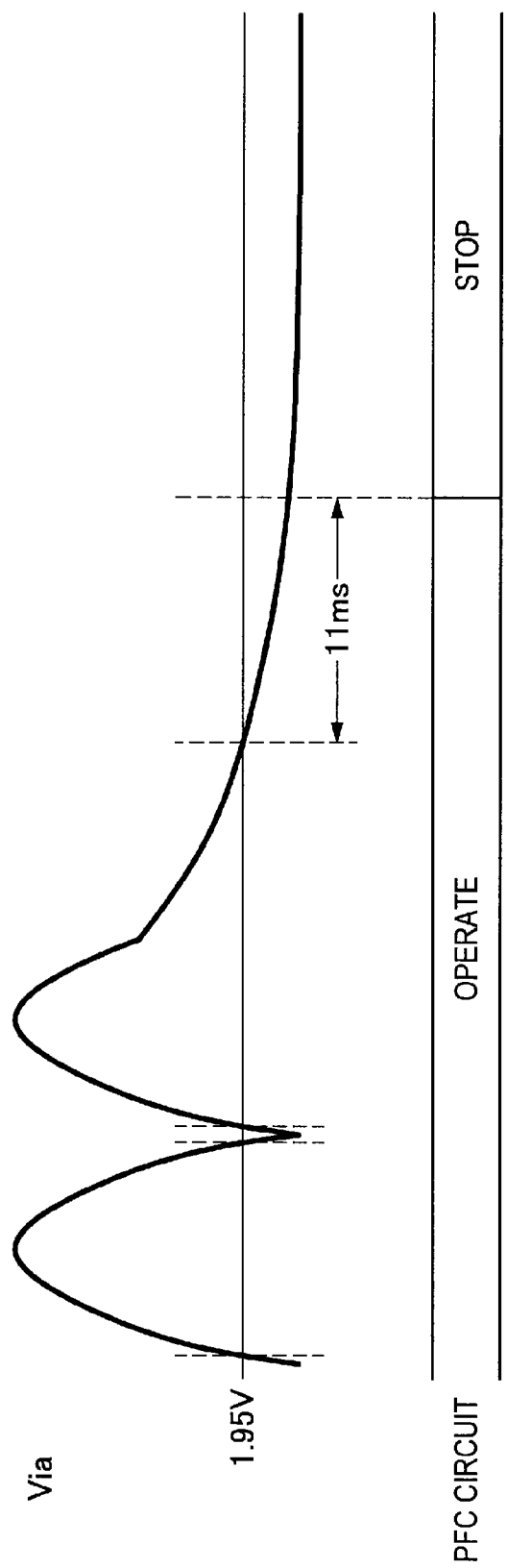
FIG. 4 is an explanatory diagram illustrating a case where the operation of a PFC circuit is stopped.

According to this embodiment, when the first time, during which the level of the input voltage Via supplied via the input terminal 210 is lower than the level of the minimum operating voltage, has reached the threshold time, a PFC-circuit stop signal for stopping the operation of the PFC circuit is output to the control circuit 112 via the input terminal 212. For example, as shown in FIG. 4, when the time during which the level of the input voltage Via supplied via the input terminal 210 is lower than 1.95 V, which is the minimum operating voltage, has reached 11 milliseconds, which is a threshold time, a PFC-circuit stop signal for stopping the operation of the PFC circuit is output to the control circuit 112 via the output terminal 112, whereby the operation of the PFC circuit stops. Accordingly, it is possible to avoid the switching element 108 from being turned on in the period when the input voltage Vi is higher than the output voltage Vo in restoration of the power supply from the alternating-current power supply 300. Thus, it is possible to avoid a possibility that an extremely large current may flow through the switching element 108 and thus avoid a possibility of degradation of or damage to the switching element 108.

Figure 5:
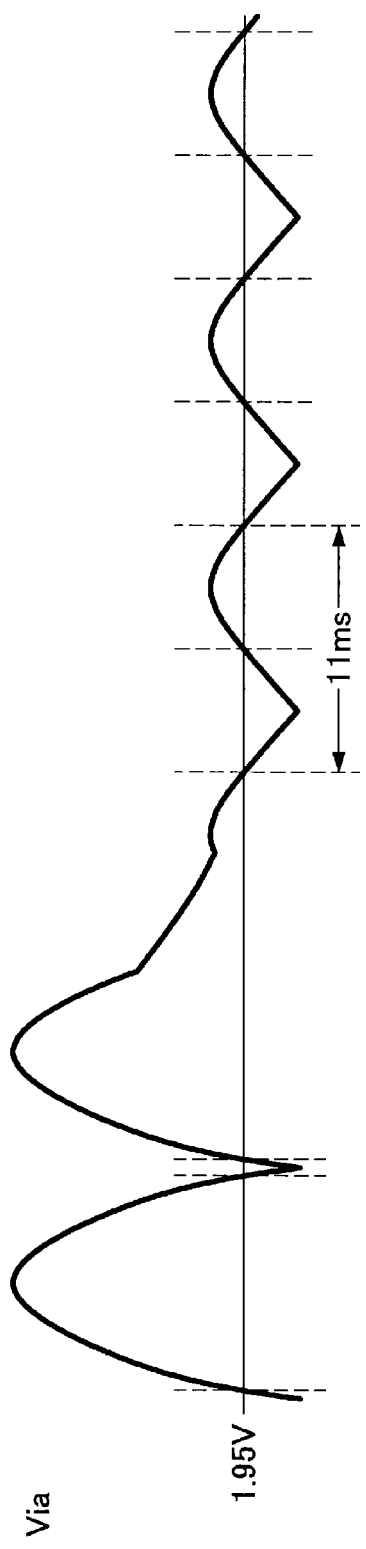
FIG. 5 is an explanatory diagram illustrating a case where the operation of a PFC circuit is not stopped.

In addition, according to this embodiment, a PFC-circuit stop signal for stopping the operation of the PFC circuit is not output to the control circuit 112 via the output terminal 212 when the first time, during which the level of the input voltage Via supplied via the input terminal 210 is lower than the level of the minimum operating voltage, has not reached the threshold time. For example, as shown in FIG. 5, when the level of the input voltage Via supplied via the input terminal 210 becomes higher than 1.95 V, which is the minimum operating voltage, before the time, during which the level of the input voltage Via is lower than 1.95 V, has reached 11 milliseconds, which is the threshold time, a PFC-circuit stop signal for stopping the operation of the PFC circuit is not output to the control circuit 112 via the output terminal 212 and thus the operation of the PFC circuit is continued. Accordingly, even when the amplitude of an alternating current supplied from the alternating-current power supply 300 abruptly decreases and the input voltage Vi abruptly drops as described with reference to FIG. 8, the operation of the PFC circuit continues as long as the peak value of the alternating current is above the minimum operating voltage. Thus, it is possible to avoid the output voltage Vo from dropping inadequately.

That is, according to this embodiment, it is possible to, when interruption of the alternating-current power supply 300 occurs, avoid a possibility of degradation of or damage to the switching element 108 by stopping the operation of the PFC circuit, and also avoid a possibility that, when an abrupt change occurs in the alternating-current power supply 300, the output voltage Vo may drop inadequately, by continuing the operation of the PFC circuit.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, although the control circuit 208 shown in FIG. 2 is adapted to output a PFC-circuit stop signal by using hardware such as the comparators 214 and 224, the PFC-circuit stop signal can be output by A/D converting a signal, which has been supplied via the input terminal 210, and processing the obtained digital signal using software.

In addition, for example, the control device 200 can include a PFC circuit and a control circuit that controls the operation of the PFC circuit.

Further, although the control circuit 208 includes the SR latch circuit 228, the SR latch circuit 228 can be omitted and an output of the comparator 224 can be supplied to the control circuit 112 via the output terminal 212.

What is claimed is:

1. A control device comprising a control unit, the control unit being configured to, when a first time, during which a level of a voltage output from a rectifier circuit for rectifying an alternating current supplied from an alternating-current power supply is lower than a level of a threshold voltage, has reached a threshold time, output a stop signal for stopping an operation of a power factor correction circuit to a control circuit that controls the operation of the power factor correction circuit, wherein the control unit includes
a comparison unit that compares the level of the voltage output from the rectifier circuit with the level of the threshold voltage,
a time-measuring unit that measures, on the basis of a result of comparison performed by the comparison unit, the first time during which the level of the voltage output from the rectifier circuit is lower than the level of the threshold voltage, and
an output unit that outputs, on the basis of a result of time-measuring performed by the time-measuring unit, the stop signal to the control circuit when the first time has reached the threshold time.

2. The control device according to claim 1, wherein the level of the threshold voltage is equal to a level of a minimum input voltage at which the power factor correction circuit is operable.

3. The control device according to claim 1, wherein the threshold time is equal to a time of a half cycle of an alternating current with the lowest frequency.

4. A power supply device comprising:
a power factor correction circuit;
a control circuit that controls an operation of the power factor correction circuit; and
a control device that outputs to the control circuit a stop signal for stopping the operation of the power factor correction circuit when a first time, during which a level of a voltage output from a rectifier circuit for rectifying an alternating current supplied from an alternating-current power supply is lower than a level of a threshold voltage, has reached a threshold time,
in which the control device includes
a comparison unit that compares the level of the voltage output from the rectifier circuit with the level of the threshold voltage,
a time-measuring unit that measures, on the basis of a result of comparison performed by the comparison unit, the first time during which the level of the voltage output from the rectifier circuit is lower than the level of the threshold voltage, and
an output unit that outputs, on the basis of a result of time-measuring performed by the time-measuring unit, the stop signal to the control circuit when the first time has reached the threshold time.

5. The control device according to claim 1, in which the time-measuring unit includes a capacitor and a current source arranged such that the capacitor is chargable by the current source.

6. The control device according to claim 5, in which the time-measuring unit further includes a switching element having a turned on state and a turned off state, said switching element being arranged such that (i) when the switching element is in the turned off state and while the level of the voltage output from the rectifier circuit is lower than the level of the threshold voltage the capacitor is charged by the current source and (ii) when the switching element is in the turned on state the capacitor is discharged.

* * * * *